(12) United States Patent
Murayama et al.

(10) Patent No.: US 8,392,024 B2
(45) Date of Patent: Mar. 5, 2013

(54) POWER ASSIST DEVICE AND METHOD OF CONTROLLING THE POWER ASSIST DEVICE

(75) Inventors: Hideyuki Murayama, Owariasahi (JP); Hitoshi Yamamoto, Takahama (JP); Ken-ichi Fujino, Aichi-gun (JP); Shinji Akiyama, Kariya (JP); Atsushi Shibata, Toyota (JP)

(73) Assignees: Toyota Jidosha Kabushiki Kaisha, Toyota-Shi (JP); Araki Manufacturing Co., Ltd., Toyota-Shi (JP)

( * ) Notice: Subject to any disclaimer, the term of this patent is extended or adjusted under 35 U.S.C. 154(b) by 390 days.

(21) Appl. No.: 12/919,573

(22) PCT Filed: Feb. 26, 2009

(86) PCT No.: PCT/IB2009/000498
§ 371 (c)(1),
(2), (4) Date: Aug. 26, 2010

(87) PCT Pub. No.: WO2009/106984
PCT Pub. Date: Sep. 3, 2009

(65) Prior Publication Data
US 2011/0010012 A1 Jan. 13, 2011

(30) Foreign Application Priority Data
Feb. 27, 2008 (JP) ................... 2008-046859

(51) Int. Cl.
*G05B 19/00* (2006.01)

(52) U.S. Cl. .............. 700/260; 29/709; 29/713

(58) Field of Classification Search .......... 700/71, 700/95, 213, 228, 230, 245, 250, 255, 257, 700/258, 260, 261; 198/339.1, 341.01, 341.02, 198/341.08, 341.09, 346.3, 463.1, 464.3, 198/464.4, 468.2, 468.4, 571–572, 577; 414/222.01, 414/222.02, 589; 29/428–431, 700, 706–709, 29/713–714, 787, 822–824; 269/56
See application file for complete search history.

(56) References Cited

U.S. PATENT DOCUMENTS
(Continued)

FOREIGN PATENT DOCUMENTS
EP        1 642 671 A1     4/2006
EP        1642671 A1 *     4/2006
(Continued)

OTHER PUBLICATIONS

J. Edward Colgate; Michael Peshkin: *Intelligent Asist Devices; Revolutionary Technology for Material Handling*, online (2002), pp. 1-6, XP002550416, Dept. of Mechanical Engineering, Northwestern University, URL:http://www.stanleyassembly.com/documents/en/cobotics%20IAD%20White%20Paper.pdf> [retrieved Oct. 14, 2000).

*Primary Examiner* — Khoi Tran
*Assistant Examiner* — Adam Mott
(74) *Attorney, Agent, or Firm* — Kenyon & Kenyon LLP

(57) ABSTRACT

A method of controlling a power assist device that includes an operating handle, a force sensor, a robot arm, an actuator that drives the robot arm, and a conveying portion for conveying the robot arm. When a body in motion, the conveying portion is controlled to move in synchronization with the body, and when the motion of the body is stopped or has resumed, the drive of the robot arm is stopped for a predetermined time, and does not resume until after a predetermined time has elapsed.

18 Claims, 6 Drawing Sheets

U.S. PATENT DOCUMENTS

| | | | | |
|---|---|---|---|---|
| 3,744,032 | A * | 7/1973 | Engelberger et al. | 700/159 |
| 4,086,522 | A * | 4/1978 | Engelberger et al. | 318/568.13 |
| 4,453,303 | A * | 6/1984 | Leddet | 29/407.05 |
| 4,589,184 | A * | 5/1986 | Asano et al. | 29/430 |
| 4,669,168 | A * | 6/1987 | Tamura et al. | 29/429 |
| 4,852,237 | A * | 8/1989 | Tradt et al. | 29/407.05 |
| 5,207,309 | A * | 5/1993 | Simpkin et al. | 198/341.09 |
| 5,311,659 | A * | 5/1994 | Barnhart et al. | 29/823 |
| 5,513,428 | A * | 5/1996 | Shiramizu et al. | 29/712 |
| 6,122,813 | A * | 9/2000 | Roy et al. | 29/407.09 |
| 6,204,620 | B1 * | 3/2001 | McGee et al. | 318/568.11 |
| 6,313,595 | B2 * | 11/2001 | Swanson et al. | 318/568.11 |
| 7,627,945 | B2 * | 12/2009 | Lee | 29/787 |
| 7,845,483 | B2 * | 12/2010 | Noguchi et al. | 198/346.3 |
| 2009/0199385 | A1 * | 8/2009 | Maruo et al. | 29/428 |
| 2009/0212478 | A1 * | 8/2009 | Murayama | 269/56 |
| 2010/0183414 | A1 * | 7/2010 | Konosu et al. | 414/589 |
| 2010/0185321 | A1 * | 7/2010 | Odashima | 700/230 |
| 2010/0301539 | A1 * | 12/2010 | Murayama | 269/74 |
| 2011/0040411 | A1 * | 2/2011 | Murayama et al. | 700/260 |

FOREIGN PATENT DOCUMENTS

| | | |
|---|---|---|
| JP | 61-244680 A | 10/1986 |
| JP | 2000-159166 A | 6/2000 |
| JP | 2000-288848 A | 10/2000 |
| JP | 2000288848 A * | 10/2000 |
| JP | 2005-028491 A | 2/2005 |
| JP | 2005-028492 A | 2/2005 |
| JP | 2009-066696 A | 4/2009 |

* cited by examiner

POWER ASSIST DEVICE AND METHOD OF CONTROLLING THE POWER ASSIST DEVICE

This is a 371 national phase application of PCT/IB2009/000498 filed 26 Feb. 2009, claiming priority to Japanese Patent Application No. 2008-046859 filed 27 Feb. 2008, the contents of which are incorporated herein by reference.

BACKGROUND OF THE INVENTION

1. Field of the Invention

The present invention relates to a power assist device, and more specifically to a power assist device that prevents a workpiece from contacting with a counter workpiece due to vibration of the workpiece, and a method of controlling the power assist device.

2. Description of the Related Art

Generally, on production sites and the like, a robot called a power assist device is used to reduce the burden on workers and to provide enhanced workability. As an example of a technique using such a power assist device, there is one in which, upon turning OFF of a deadman switch, which is used for stopping supply of electric power to an assist-conveyance motor to turn an assist-conveyance state OFF, the rotational speed of the assist-conveyance motor is gradually lowered to zero, thereby suppressing vibration of a workpiece due to an abrupt stop (see, for example, Japanese Patent Application Publication No. 2005-28491 (JP-A-2005-28491)).

The characteristic feature of the assist-conveyance stopping method described in JP-A-2005-28491 is as follows. When the deadman switch is switched OFF, supply of power to a motor that constitutes an assist-conveyance actuator is interrupted. The output shaft of the motor is provided with a brake mechanism that engages when a solenoid is energized, and disengages when the energization is interrupted. With the above configuration, from a time t1 when the deadman switch is turned OFF, a delay td is set longer than the time that it takes for the rotational speed of the motor to become zero, thereby reducing the occurrence of an impact or a device breakdown.

However, the assist-conveyance stopping method disclosed in JP-A-2005-28491 takes no consideration to the risk of contact with another workpiece (counter workpiece) due to vibration of an arm following the running or stopping of a conveyor.

Specifically, if the technique described in JP-A-2005-28491 is applied to, for example, a task of fitting a windshield (it corresponds to a windscreen) to the body of an automobile that is conveyed by a conveyor, the following problems occur upon abrupt stop or restarting (abrupt start) of the conveyor. (1) The windshield and the body come into contact with each other. (2) Adhesive (reference numeral 12 in FIG. 6) applied to the surface of the windshield adheres to the body, and thus needs to be wiped off. Further, because the amount of adhesive decreases due to its adhesion onto the body, if bonding to a predetermined position is performed in this state, the amount of adhesive becomes insufficient, so there is a need to replenish adhesive. (3) When inserting the windshield into a gap between the trunk (it corresponds to a boot) and the body, the windshield hits the trunk or the body.

The above-described problems occur may occur for at least one of the following reasons. (a) The conveyor that conveys the body must be brought to an immediate stop in the event of emergency, resulting in an abrupt stop, so the impact becomes large. (b) Because the entire assist device is advancing in a synchronized manner in the advancing direction of the conveyor that conveys the body, the impact exerted upon the abrupt stop of the conveyor also causes the assist device to vibrate. (c) Because the worker riding on the conveyor is also advancing in synchronization with the advancing of the conveyor that conveys the body, the impact exerted upon the abrupt stop of the conveyor is applied to the operating handle held by the worker. (d) There is a delay between when the worker recognizes the stop of the conveyor, and when the worker actually releases the deadman switch and brake is applied by the actuator. That is, because the plurality of vibrations due to impact described above occur in an overlapping manner, there are such risks as collision between the windshield and the vehicle, adhesion of adhesive to the vehicle, and flatting the adhesive that has adhered.

SUMMARY OF THE INVENTION

The present invention provides a power assist device that prevents a workpiece from contacting with a counter workpiece due to vibration of the workpiece following an abrupt stop/abrupt start, and a method of controlling the power assist device.

A first aspect of the present invention relates to a method of controlling a power assist device that includes: an operating part that is operated by an operator; operating force detecting means that detects an operating force that is applied to the operating part; a robot arm that supports the operating part, and holds a workpiece; driving means for driving the robot arm in accordance with the detected operating force; conveying means for conveying the robot arm that holds the workpiece; and counter workpiece conveying means for conveying a counter workpiece. In the method of controlling a power assist device, controlling the counter workpiece conveying means so that the conveying means moves synchronously with the counter workpiece when a conveyance path is in motion. Also, in the method of controlling a power assist device, stopping the driving means for a predetermined time period to stop drive of the robot arm when the motion of the counter workpiece on the conveyance path has stopped or when the motion of the conveyance path resumes.

In the above-mentioned aspect, the drive of the robot arm by the driving means may resume after the predetermined time has elapsed.

According to the above-mentioned aspect, it is possible to prevent the workpiece and the counter workpiece from contacting each other due to vibration of the workpiece following an abrupt stop/abrupt start.

In the above-mentioned aspect, the operating part may include a deadman switch with which the drive of the driving means is switched ON/OFF by the operator. After the predetermined time has elapsed, the drive of the driving means may be resumed after the drive of the driving means is switched from ON with the deadman switch.

According to the above-mentioned aspect, it is possible to prevent the workpiece and the counter workpiece from contacting each other due to vibration of the workpiece following an abrupt stop/abrupt start. Further, because the drive of the driving means is resumed by means of the deadman switch, work can be resumed with safety while reflecting operator's intention.

In the above-mentioned aspect, even if the predetermined time has not elapsed, the drive of the driving means may resume when the deadman switch is switched ON.

According to the above-mentioned aspect, because the judgment of the situation by the operator serves as the criterion for resuming drive, it is possible to quickly resume work.

In the above-mentioned aspect, the drive of the robot arm by the driving means may not be stopped when a distance between the counter workpiece and one of the robot arm and the workpiece is equal to or greater than a predetermined distance.

In the above-mentioned aspect, the predetermined time, over which the driving of the robot arm by the driving means is stopped, may be determined based on the distance between the counter workpiece and one of either the robot arm (3) and the workpiece.

In the above-mentioned aspect, the robot arm may include detecting means for detecting vibration of the workpiece. The predetermined time, over which the driving of the robot arm by the driving means is stopped, may be determined based on the vibration state of the workpiece detected by the detecting means.

A second aspect of the present invention relates to a method of controlling a power assist device, the power assist device including: holding means for holding a workpiece; driving means for driving the holding means; conveying means for conveying the holding means in a predetermined direction wherein the conveying means is moved synchronously with the counter workpiece conveying means; and counter workpiece conveying means for conveying a counter workpiece. Controlling the counter workpiece conveying means so that the conveying means moves synchronously with the counter workpiece when a conveyance path is in motion. Stopping the driving means for a predetermined time period to stop drive of drive of the holding means when the motion of the counter workpiece on the conveyance path has stopped or when the motion of the conveyance path resumes.

A third aspect of the present invention relates to a power assist device including: an operating part that is operated by an operator; operating force detecting means for detecting an operating force applied to the operating part; a robot arm that supports the operating part, and holds a workpiece; driving means for driving the robot arm based on the operating force detected by the operating force detecting means; conveying means for conveying the robot arm in a predetermined direction; a controller that controls motions of the driving means and the conveying means wherein the controller controls the conveying means to moved synchronously with the counter workpiece conveying means; and counter workpiece conveying means for conveying a counter workpiece. The controller controls the counter workpiece conveying means to move the conveying means synchronously with the counter workpiece when a conveyance path is in motion, and to stop the driving means, to stop the drive of the robot arm, for a predetermined time period when the motion of the counter workpiece on the conveyance path has stopped or when the motion of the conveyance path resumes.

In the above-mentioned aspect, the controller may control the drive of the robot arm by the driving means to resume after the predetermined time has elapsed.

According to the above-mentioned aspect, it is possible to prevent the workpiece and the counter workpiece from contacting each other due to vibration of the workpiece following an abrupt stop/abrupt start.

In the above-mentioned aspect, the operating part may include a deadman switch by which the operator switches the drive of the driving means ON/OFF. After the predetermined time has elapsed, the controller may resume the drive of the driving means when the drive of the driving means is switched from ON with the deadman switch.

According to the above-mentioned aspect, it is possible to prevent the workpiece and the counter workpiece from contacting each other due to vibration of the workpiece following an abrupt stop/abrupt start. Further, because the drive of the driving means is resumed by means of the deadman switch, work can be resumed with safety while reflecting operator's intention.

In the above-mentioned aspect, even if the predetermined time has not elapsed, the controller may resume the drive of the driving means by switching the deadman switch from OFF to ON.

According to the above-mentioned aspect, because the judgment of the situation by the operator serves as the criterion for resuming drive, it is possible to quickly resume work.

In the above-mentioned aspect, the operating part may include a deadman switch by which the operator switches the drive of the driving means ON/OFF. And, even if the predetermined time has not elapsed, the controller may resume the drive of the driving means by switching the deadman switch from OFF to ON.

In the above-mentioned aspect, the controller may not stop the drive of the robot arm by the driving means, if a distance between the counter workpiece and one of the robot arm and the workpiece is equal to or greater than a predetermined distance.

In the above-mentioned aspect, the controller may stop the drive of the robot arm by the driving means for the predetermined time, in accordance with a distance between the counter workpiece and one of the robot arm and the workpiece.

In the above-mentioned aspect, the robot arm may include detecting means for detecting vibration of the workpiece. The controller may stop the drive of the robot arm by the driving means for the predetermined time, in accordance with the vibration state of the workpiece detected by the detecting means.

A fourth aspect of the present invention relates to a power assist device including: holding means for holding a workpiece; driving means for driving the holding means; conveying means for conveying the holding means in a predetermined direction; a controller that controls motions of the driving means and the conveying means, and counter workpiece conveying means for conveying a counter workpiece. The controller controls the conveying means to move synchronously with the counter workpiece conveying means. And the controller controls the counter workpiece conveying means to move the conveying means synchronously with the counter workpiece when a conveyance path is in motion, and to stop the driving means, to stop the drive of the holding means, for a predetermined time period when the motion of the counter workpiece on the conveyance path has stopped or when the motion of the conveyance path resumes.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EXAMPLE EMBODIMENT

Figure 1:
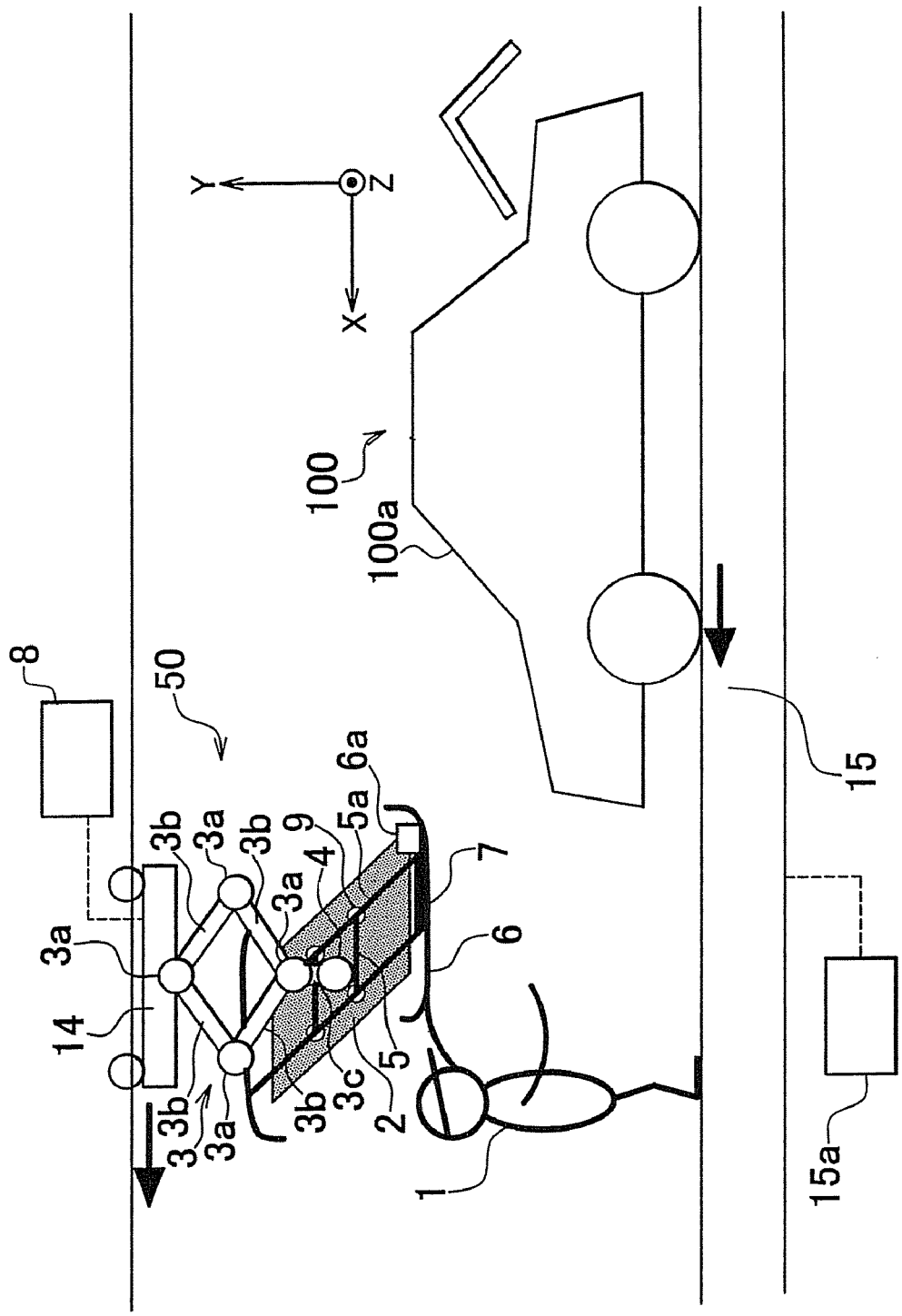
FIG. 1 is a schematic view showing the overall structure of a power assist device according to an embodiment of the present invention.

An embodiment of the present invention will be described with reference to FIGS. 1 to 6. For the ease of understanding, the embodiment in the context of moving a workpiece, which is an object to be conveyed, in the XY plane of a XYZ coordinate system shown in FIG. 1. In the following description, it is assumed for the convenience of description that the direction indicated by the arrow X in FIG. 1 is the direction in which the operation proceeds. In this embodiment, the primary task that an operator 1 is to perform is to hold a windshield 2 (i.e., the workpiece) with a robot arm 3, and mount the windshield 2 to a windshield frame 100a of an automobile body 100 that is conveyed at a constant speed on an assembly line while being placed on a conveyor 15, which serves as conveying means shown in FIG. 1.

First, the overall structure of a power assist device according to the present embodiment will be described with reference to FIG. 1. As shown in FIG. 1, a power assist device 50 includes the robot arm 3; a free joint 4; a suction jig 5, supported by the robot arm 3 via the free joint 4, that holds the windshield 2; an operating handle 6, provided on the suction jig 5, that is operated by the operator 1; a deadman switch 6a equipped to the operating handle 6; a force sensor 7 that detects an operating force acting on the operating handle 6 and its direction; an actuator 11 (shown in FIG. 2) that drives the robot arm 3 based on the detected operating force, and direction; conveying means 14 that is arranged above the robot arm 3 and supports the robot arm 3 so as to be movable in a predetermined direction, and a controller 8 that controls the motions of the actuator 11 and the conveying means 14.

As shown in FIG. 1, the robot arm 3 is constructed as a closed loop link mechanism shaped like a pantograph in side view, and individual links 3b are connected via a plurality of joints 3a (at four locations in this example). The distal end of the robot arm 3 serves as an end-effector 3c and is joined via the free joint 4 to the suction jig 5. The free joint 4 allows the attitude of the windshield 2 held by the suction jig 5 to oscillate three-dimensionally.

In addition, the individual joints 3a, the free joint 4, and the individual links 3b constitute a link mechanism. An actuator 11 (shown in FIG. 2) is attached to the link mechanism. The link mechanism is driven by the actuator 11, thus allowing the end-effector 3c of the robot arm 3 to oscillate three-dimensionally. Thus, the suction jig 5 connected to the robot arm 3 via the free joint 4 can oscillate three-dimensionally with respect to the robot arm 3. During normal conveyance, when the operator 1 rotates the windshield 2 about the yaw axis and the roll axis with the operating handle 6, the robot arm 3 moves the end-effector 3c of the robot arm 3 in the transverse direction (lateral direction in FIG. 1) and the longitudinal direction (vertical direction in FIG. 1), respectively, thereby making it possible to move the windshield 2. That is, the windshield 2 may be moved in a direction in which the operator 1 tilts the suction jig 5 using the operating handle 6.

Figure 3:
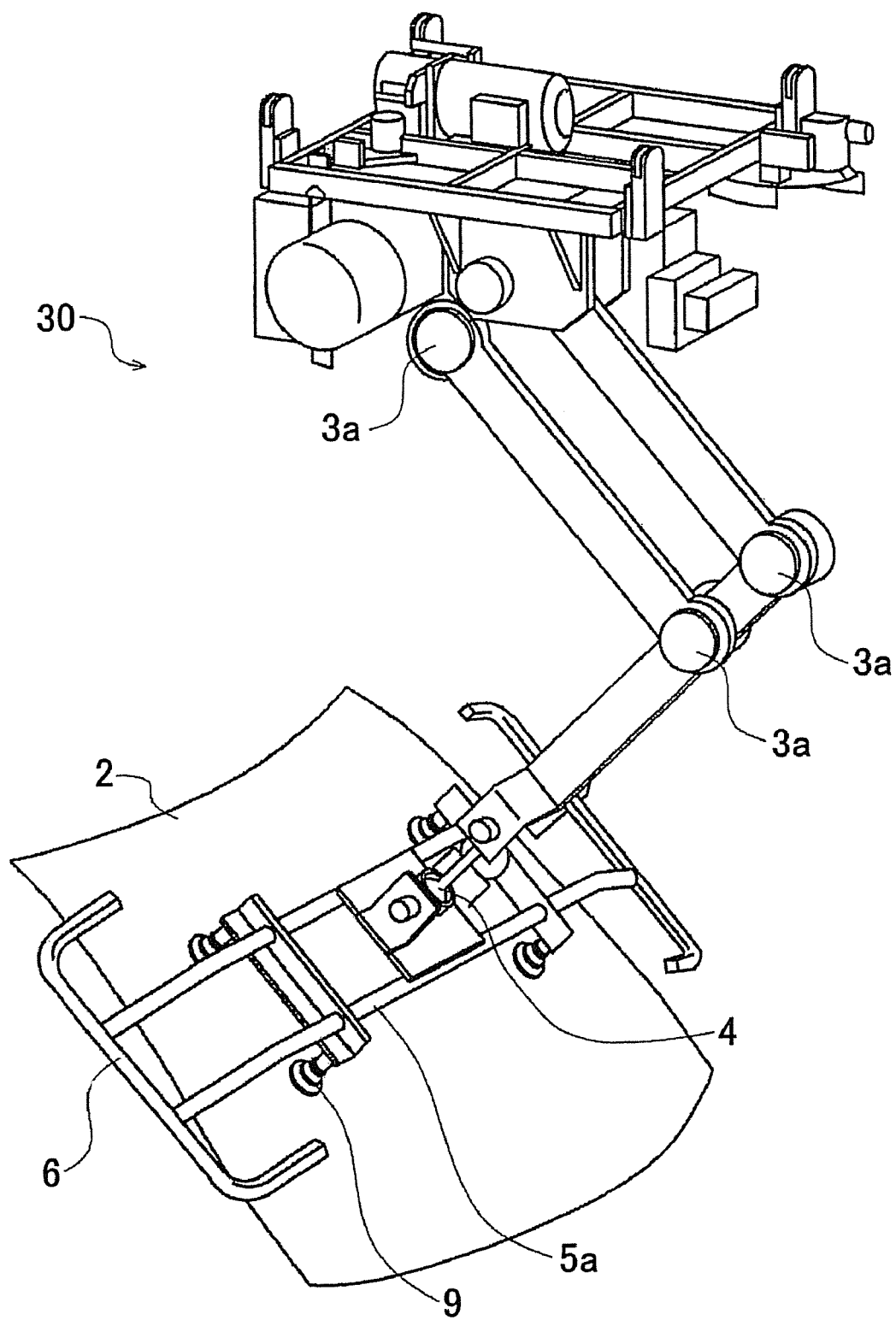
FIG. 3 is a perspective view showing another example of a robot arm in the power assist device.

While this embodiment is directed to the case of the power assist device 50 equipped with the robot arm 3 shaped like a pantograph in side view as shown in FIG. 1, the present invention is not restricted to this. For example, the robot arm may be a robot arm 30 that is a manipulator type articulated robot as shown in FIG. 3. The portions of the robot arm 30 shown in FIG. 3 having the same members and functions as those of the robot arm 3 described above are denoted by the same reference numerals. While the following description is directed to the robot arm 3 only, the same description may apply to the robot arm 30.

Also, an encoder 10 (shown in FIG. 2) serves as an angle detecting means for detecting the angle of each link 3b that relates to the poison of the each link 3b is arranged in each joint 3a of the robot arm 3 and the free joint 4. The angle detected by the encoder 10 is sent to the controller 8. The controller 8 then determines the position of the windshield 2 and the attitude of the windshield 2 from the detected angle.

The suction jig 5 includes a frame 5a, and the operating handle 6 hangs over on both of the left and right sides of the frame 5a (on either side with respect to the arrow X). The operating handle 6 is held by the operator 1 to operate the suction jig 5. The suction jig 5 is suspended at the end-effector 3c of the robot arm 3 via the free joint 4, and holds the windshield 2.

Specifically, a plurality of suction cups 9 that adhere to the front surface of the windshield 2 (that is, the surface that becomes the outer side of the body 100 upon attaching the windshield 2 to the body 100) are attached at the lower end of the frame 5a (e.g., at four locations in this embodiment). To hold the windshield 2 by the suction jig 5, the suction cups 9 are brought into contact with the front surface of the windshield 2, and the air inside the suction cups 9 is withdrawn by a pump. Thus, the windshield 2 is held by the suction jig 5 via the suction cups 9. To release the windshield 2 from the suction jig 5, the withdrawal of air by the pump is stopped, and air is injected between the suction cups 9 and the windshield 2, thereby releasing the windshield 2 from the suction cups 9. The windshield 2 is thus released from the suction jig 5.

As shown in FIG. 1, the above-mentioned operating handle 6 is substantially U shaped in plan view, and is arranged at both ends of the suction jig 5. The force sensor 7 is disposed near the central portion in the width direction of one of the operating handles 6 (the side where the operator 1 holds the handle). The deadman switch 6a is disposed on one side of the one operating handle 6. The operating handle 6 is held by the operator 1 when mounting the windshield 2 on the windshield frame 100a of the body 100. As the operator 1 holds the operating handle 6, the suction jig 5 becomes stable, allowing the operator 1 to adjust the position of the windshield 2 with respect to the windshield frame 100a.

To ensure safety, the deadman switch 6a is configured such that power is supplied to the actuator 11 of the robot arm 3 to drive the actuator 11 only while the operator 1 is pressing the deadman switch 6a (only while the deadman switch 6a is being switched ON), and when the operator 1 releases the deadman switch 6a (while the deadman switch 6a is being switched OFF), the supply of power is stopped and the actuator 11 is not driven. The deadman switch 6a is connected to the controller 8. While the deadman switch 6a is disposed in one of the operating handles 6 (shown in FIG. 1) in this embodiment, the present invention is not particularly restricted to this. By taking workability or the like into consideration, it is also possible to dispose the deadman switch 6a in the other one of the operating handles 6.

The force sensor 7 is arranged between the operating handle 6 and the frame 5a of the suction jig 5 to detect an operating force exerted on the operating handle 6, and the direction of the operating force. That is, the force sensor 7 detects torque as the operating force applied to the windshield 2 by the operator 1 working in cooperation with the power assist device 50. The operating force applied by the operator 1 and the direction of the operating force thus detected by the force sensor 7 are sent to the controller 8 described later. While the force sensor 7 is disposed in only one of the operating handles 6 in this embodiment, the present invention is not particularly restricted to this. The force sensor 7 may be disposed near both of the operating handles 6.

Figure 2:
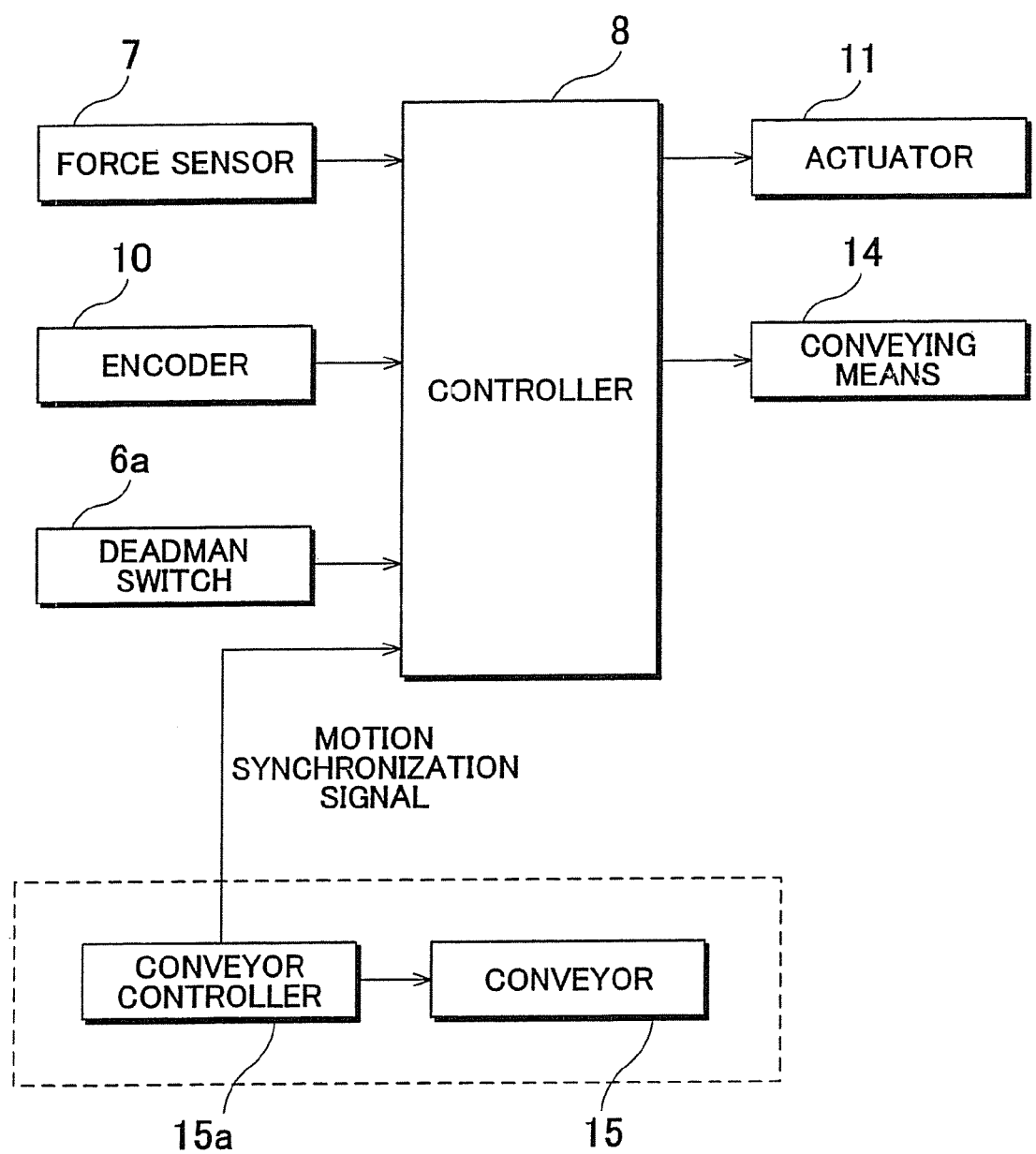
FIG. 2 is a block diagram showing the structure of the control system of the power assist device.

As shown in FIG. 2, the controller 8 is connected with the above-described force sensor 7, the encoder 10, the deadman switch 6a, the actuator 11 for driving the robot arm 3, the conveying means 14 for conveying the robot arm 3 in a predetermined direction, and a conveyor controller 15a described later which controls the conveyor 15. The motion of the individual units of the power assist device 50 are controlled by the controller 8. The controller 8 estimates the intention of the operator 1 (which in this embodiment is the intention of moving the windshield 2 in a predetermined direction to attach the windshield 2) in real time based on the operating force and the direction of the operating force detected by the force sensor 7, and positional information on the suction jig 5 (windshield 2) based on the encoder 10, and the like. Then, by driving the actuator 11, the controller 8 controls the robot arm 3 to generate an assist force described later that is determined in accordance with the direction of an operating force applied by the operator 1.

The controller 8 is configured by an unillustrated central processing unit (CPU), a storage (a hard disk device, a RAM, or a ROM), an interface, and the like. The storage stores various information for determining the conditions under which the drive of the actuator 11 is to be controlled, from the relationship between an operating force applied to the operating handle 6 by the operator 1 and the direction of the operating force. Also, the controller 8 has an unillustrated command value computing device/command value output device.

The conveyor 15 conveys the body 100 (i.e., the counter workpiece) along the assembly line as shown in FIG. 1. As shown in FIG. 1, the conveyor 15 places the body 100 on a carriage (not shown) and moves the body 100 (to the left in FIG. 1) along the assembly line (i.e., conveyance path) at a predetermined speed. While the body 100 is moved at a constant speed along the assembly line, a worker (the operator 1) rides on the conveyor 15 and performs a task of mounting various parts to predetermined locations of the body 100 (e.g., mounting the windshield 2 in this embodiment). The conveyor 15 is driven by a driving means, and includes the conveyor controller 15a that controls the motion of the conveyor 15. The conveyor controller 15a executes controls related to conveyance of the conveyor 15, such as running (moving), stoppage, or speed adjustment of the conveyor 15.

At the time of performing a task in which the worker mounts a part to the body 100 (under normal conditions), the conveyor 15 moves at a constant speed, and similarly, the body 100 placed on the conveyor 15 also moves at a constant speed along the assembly line. While riding on the conveyor 15, the operator 1 of the power assist device 50 mounts the windshield 2 on the windshield frame 100a of the body 100 by operating the operating handle 6 to use the assist force of the robot arm 3.

Next, a method of controlling the power assist device 50 by the controller 8 according to the present embodiment will be described with reference to FIGS. 2 and 5.

As described above, when the operator 1 performs a task of moving the windshield 2 to the windshield frame 100a of the body 100 in cooperation with the robot arm 3 by using the power assist device 50 while being on the conveyor 15, and mounting the windshield 2 to the windshield frame 100a, under normal conditions in which the conveyor 15 is in motion, the controller 8 causes the body 100 to move forward (in the arrow X direction) at a constant speed along the assembly line while being placed on a given placing location (carriage) on the conveyor 15, and the controller 8 also causes the entire power assist device 50 to move forward in synchronization with this motion of the body 100 on the conveyor 15. That is, the controller 8 causes the conveying means 4 supporting the robot arm 3 that holds the windshield 2 to move forward, in synchronization with the motion of the body 100. That is, as shown in FIG. 2, under normal working conditions, upon receiving a motion synchronization signal from the conveyor controller 15a, the controller 8 performs control in synchronization with the motion of the conveyor 15 so as to move the conveying means 14 at the same speed along the assembly line.

Figure 4:
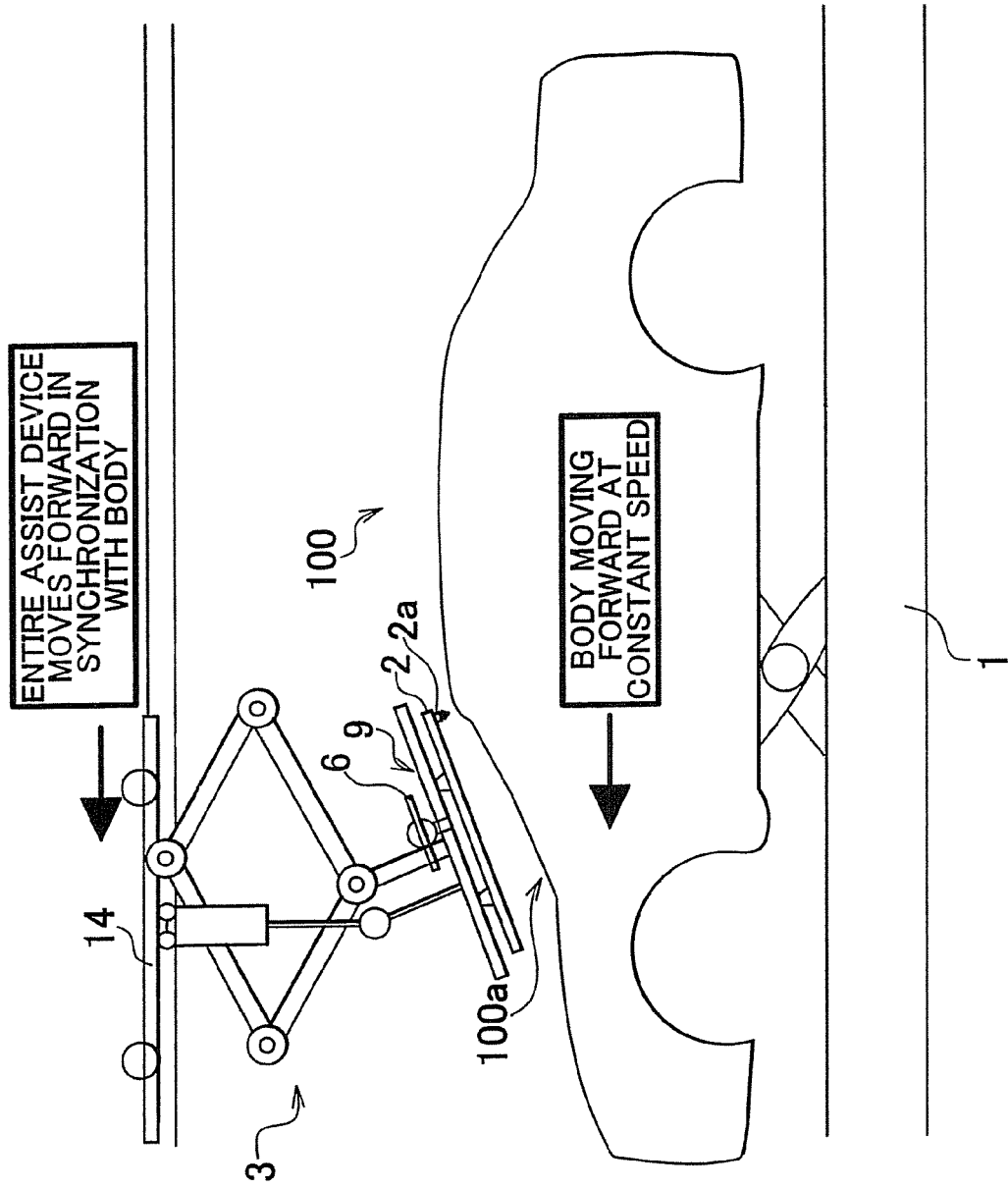
FIG. 4 is a schematic view showing how a windshield is mounted to a body.
Figure 5:
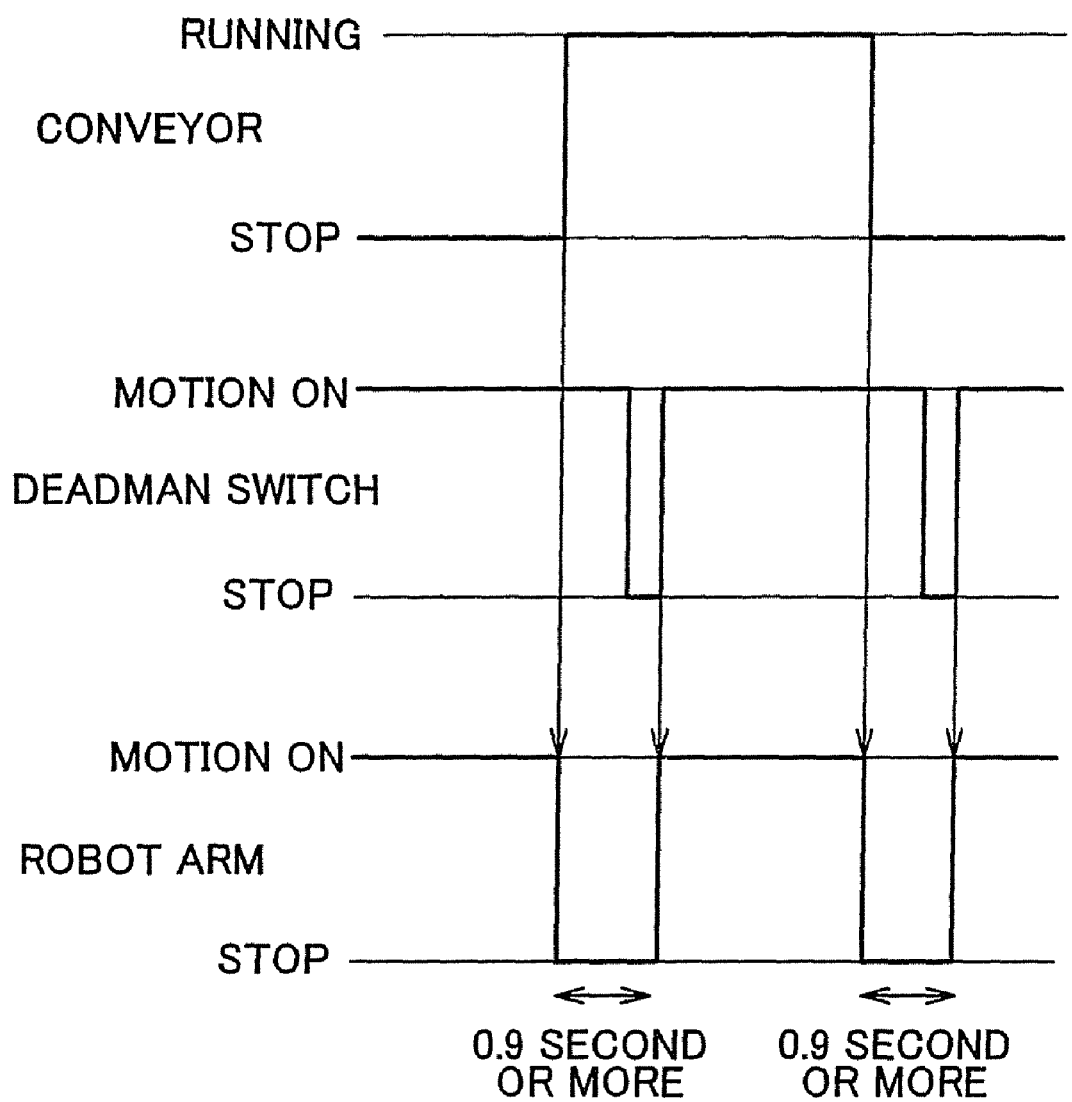
FIG. 5 is a timing chart showing the motion state.

When the windshield 2 and the body 100 are approaching each other as shown in FIG. 4, if, while the conveyor 15 is active, a signal for commanding motion to the conveyor 15 changes from running to stop, or from stop to running as shown in FIG. 5, the controller 8 immediately stops the motion of the robot arm 3 for a predetermined time (which in this embodiment is set to 0.9 second), and does not accept an operation from the operator 1 during that time. That is, the controller 8 does not accept an operation from the operator 1 until the vibration of the robot arm 3 or windshield 2 subsides.

That is, if the operator 1 commands the conveyor controller 15a to change the motion state of the conveyor 15 from a running state (moving state) to a stopped state, or from a stopped state to a running state (moving state), the controller 8 simultaneously sends the above-mentioned command to the controller 8 of the actuator 11, and the controller 8 stops the actuator 11 for a predetermined time (which in this embodiment is set to 0.9 second).

On the other hand, if the workpiece and the body 100 are separated by a predetermined distance, the above-mentioned command is not sent to the controller 8, and the actuator 11 is not stopped. In this embodiment, by taking into consideration the time for the vibration of the robot arm 3 or windshield 2 to subside, the stopping time of the actuator 11 is set to about 0.9 second. However, the present invention is not restricted to this. The stop time may be set as appropriate in accordance with the mode of conveyance of the workpiece and the counter workpiece, or the like. Also, the controller 8 may be set so as to control the stop time of the actuator 11 in accordance with the distance between the workpiece and the body 100. Alternatively, vibration detecting means may be included in the robot arm 3, and the controller 8 may be set so as to control the stop time of the actuator 11 in accordance with the vibration state of the workpiece.

As previously described, the controller 8 resumes the drive of the actuator 11 for moving the robot arm 3, after the robot arm 3 is stopped for a predetermined time (upon elapse of 0.9 second). Then, the controller 8 controls the drive of the actuator 11 based on the operating force detected by the force sensor 7.

Further, in a case where the situation surrounding the operator 1 is to be taken into consideration as well, it is also possible to resume the drive of the actuator 11 for moving the robot arm 3 when the deadman switch 6a is switched from OFF to ON (when the operator 1 presses the deadman switch 6a again with the intention of resuming work). In this case, because the judgment of the situation by the operator 1 serves as the criterion for resuming drive, it is possible to ensure greater work safety.

It is also possible to make a setting in advance such that even while the robot arm 3 is stopped for a predetermined time as mentioned above, the drive, of the actuator 11 for moving the robot arm 3 is resumed by the operator 1 switching the deadman switch 6a from OFF to ON. In this case, because the judgment of the situation by the operator 1 serves as the criterion for resuming drive, it is possible to resume work quickly.

To facilitate understanding of the present embodiment, the description is directed to the case in which the motion state of the conveyor 15 is changed from a running state to a stopped state, or from a stopped state to a running state. However, the present invention is not particularly limited to this. It is of course possible as a matter of course to apply the present invention to cases in which a situation similar to abrupt stop/abrupt start, that is, a situation that causes an abrupt speed change has arisen.

Figure 6:
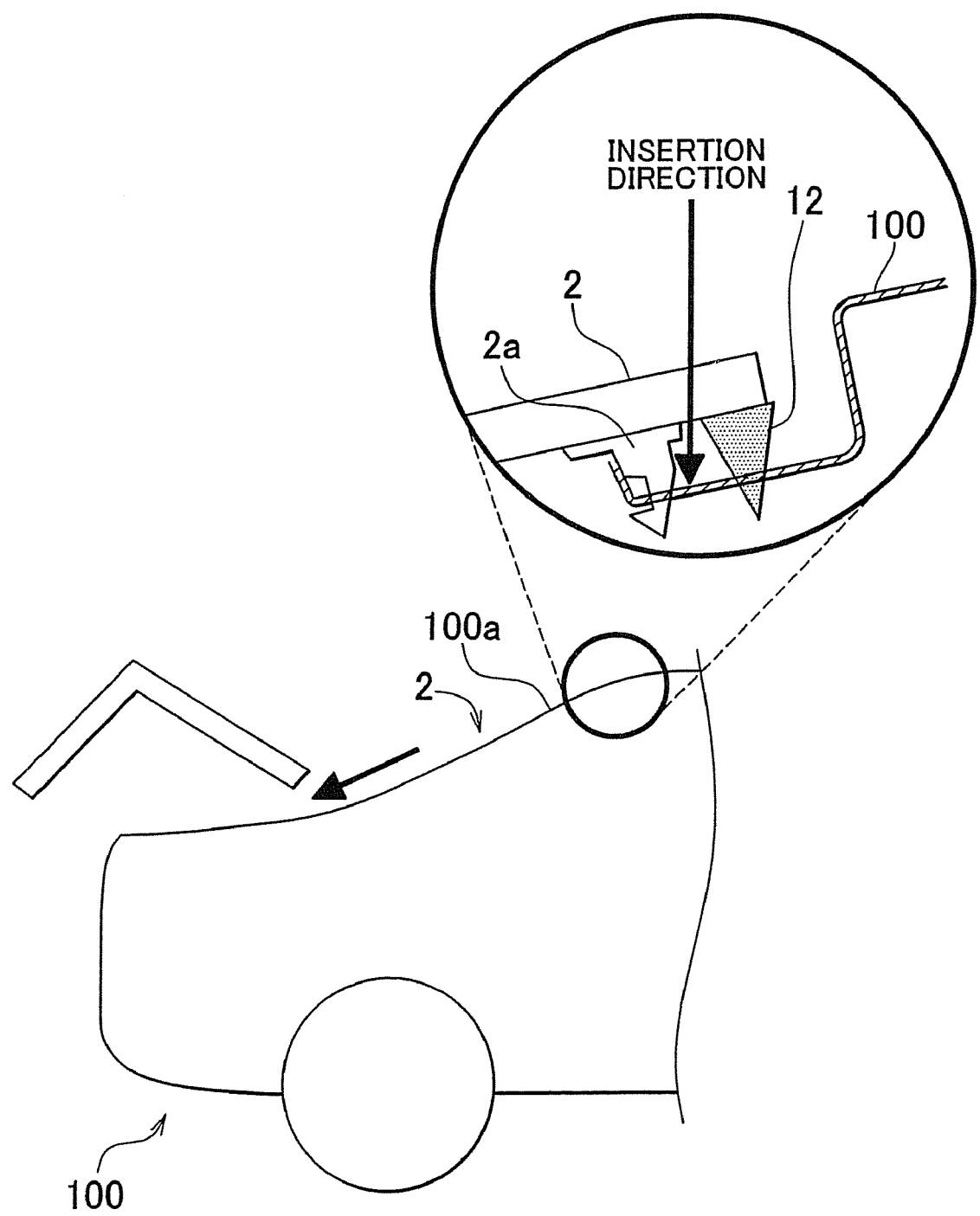
FIG. 6 is an enlarged schematic view showing the upper end portion of the windshield when the windshield is attached to the body.

Next, a description will be given of a task in which, with the power assist device 50 and the conveyor 15 configured as described above, the robot and the worker cooperate with each other to mount the windshield 2 to the windshield frame 100a of the body 100 by applying the above-described method of controlling the power assist device 50. Specifically, a description will be given of a case in which the present invention is applied to a task in which, as shown in FIG. 6, urethane 12 as adhesive is applied near the top of an up stopper 2a located at the upper end of the windshield 2, and the up stopper 2a is inserted into an engaging hole for the up stopper 2a provided at the top of the windshield frame 100a of the body 100 to thereby mount the windshield 2.

As shown in FIG. 4, the body 100 is placed on the conveyor 15, and is moving to the left in FIG. 1 at a constant speed. The entire power assist device 50 is moving to the left in FIG. 1 in synchronization with the body 100. In a state of the operator 1 riding on the conveyor 15, the operator 1 guides the robot arm 3 while holding the operating handle 6 and adjusting the position and attitude of the windshield 2, thereby conveying the windshield 2 to a position above the windshield frame 100a that is the fitting position of the windshield 2.

When the windshield 2 and the body 100 are brought close to each other within a predetermined distance, the above-described method of controlling the power assist device 50 is applied. For example, as shown in FIG. 4, the windshield 2 is positioned slightly above the windshield frame 100a. The operator 1 positions the up stopper 2a, which is provided at the upper end of the windshield 2, vertically above the engaging hole that engages with the up stopper 2a. At this time, if, as the operator 1 holds the operating handle 6 at this position and is about to bring the windshield 2 closer to the windshield frame 100a as a target position, the conveyor controller 15a sends to the conveyor 15 a command for changing the motion state of the conveyor 15 from a running state to a stopped state (for example, an emergency stop command) due to some reason, the controller 8 of the robot arm 3 simultaneously receives the command, and stops the actuator 11 of the robot arm 3 for a predetermined time (which in this embodiment is 0.9 second). If the vibration of a part of the power assist such as the robot arm 3, the windshield 2, or the like subsides during this time, and the predetermined time elapses, the drive of the robot arm 3 is resumed, and based on an operating force detected by the force sensor 7, the controller 8 controls the drive of the actuator 11.

The control method using the deadman switch 6a is a control method that further factors safety into the above-described control method. Accordingly, drive of the robot arm 3 is not resumed immediately after the actuator 11 is stopped for a predetermined time as mentioned above. Instead, after t is confirmed by the operator 1 that the vibration of a part of the power assist device 50 such as the robot arm 3, the windshield 2, or the like has subsided, drive of the robot arm 3 is resumed after the deadman switch 6a is switched (pressed again) from OFF to ON by the operator 1 upon judging that it is possible to resume the drive. Then, the controller 8 controls the drive of the actuator 11 based on an operating force detected by the force sensor 7. In this case, because the judgment made by the operator 1 is also taken into consideration, even when a kind of vibration that is not envisaged occurs and a prolonged vibration time results, such a situation can be dealt with.

Thus, according to the method of controlling the power assist device 50 according to the present embodiment, for tasks which require high-precision positioning of a workpiece with respect to a moving workpiece and in which adhesion of adhesive to locations other than a desired location is to be avoided, such as a task of fitting the windshield 2 applied with adhesive to the body 100 of an automobile being moved by the conveyor 15, the command speed to the robot arm 3 supporting the workpiece (windshield 2) is set to zero upon reception of a signal for stopping/resuming motion of the moving counter workpiece (body 100). Thus, unintended motion of the robot arm 3 due to abrupt stop or abrupt start of the moving workpiece (windshield 2) is prevented, and contact between the workpieces can be avoided, thereby achieving an improvement in quality.

In this way, a method of controlling the power assist device 50 is employed, the power assist device 50 including: the operating handle 6 as an operating part operated by the operator 1; the force sensor 7 as operating force detecting means for detecting an operating force applied to the operating handle 6; the robot arm 3 that supports the operating handle 6, and holds the windshield 2 as a workpiece; the actuator 11 as driving means for driving the robot arm 3 based on the operating force detected by the force sensor 7; and the conveying means 14 for conveying the robot arm 3 holding the windshield 2 in a predetermined direction, the conveying means 14 being moved in synchronization with the body 100 as a counter workpiece that is moving on the assembly line as a conveyance path, the windshield 2 being mounted to a predetermined position of the body 100. In the method of controlling the power assist device 50, under normal conditions in which the motion state of the body 100 with respect to the assembly line maintains a moving state, control is performed such that the conveying means 14 moves in synchronization with the body, and when the motion state of the body 100 with respect to the assembly line has changed from a moving state to a stopped state or from a stopped state to a moving state, drive of the robot arm 3 by the actuator 11 is stopped for a predetermined time, and after elapse of the predetermined time, the drive of the robot arm 3 by the actuator 11 is resumed. It is thus possible to prevent the windshield 2 and the body 100 contacting each other due to vibration of the windshield 2 following an abrupt stop/abrupt start.

Also, by employing a method of controlling the power assist device 50 in which the operating handle 6 includes the deadman switch 6a with which the drive of the actuator 11 is switched ON/OFF by the operator 1, and in which after elapse of the predetermined time, the drive of the actuator 11 is resumed after the drive of the actuator 11 is switched from OFF to ON with the deadman switch 6a, it is possible to prevent the windshield 2 and the body 100 contacting each other due to vibration of the windshield 2 following an abrupt stop/abrupt start. Further, because the drive of the actuator 11 is resumed by means of the deadman switch 6a, work can be resumed with safety while reflecting operator's intention.

Further, according to the present embodiment, if the conveyor 15 abruptly stops/starts, the conveying means 14 for the robot arm 3 moves in synchronization with such motion. Accordingly, because the robot arm 3 is not operated even when the robot arm 3 vibrates due to vibration of the suction jig 5, or even when the operator 1 himself/herself vibrates and thus a vibratory operating force is applied to the force sensor 7, it is possible to prevent the robot arm 3 from being driven and contacting the body 100.

While this embodiment is described in the context of attaching the windshield 2, the application of the present invention is not restricted to this context. The present invention may also be applied to a broad range of tasks that involve mounting an object (workpiece) to a predetermined position by using a robot.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A method of controlling a power assist device that includes an operating part operated by an operator, an operating force detecting portion that detects an operating force that is applied to the operating part, a robot arm that supports the operating part and holds a workpiece, a driving portion that drives the robot arm based on the operating force detected by the operating force detecting portion, a conveying portion that conveys the robot arm in a predetermined direction, and a counter workpiece conveying portion that conveys a counter workpiece, wherein the conveying portion is moved in synchronization with the counter workpiece conveying portion, the control method comprising:
   controlling the conveying portion so that the conveying portion moves synchronously with the counter workpiece when a conveyance path is in motion; and
   stopping control over the driving portion for a predetermined time period to stop drive of the robot arm when the motion of the counter workpiece on the conveyance path has stopped or when the motion of the conveyance path resumes.

2. The method of controlling a power assist device according to claim 1, wherein the drive of the robot arm by the driving portion resumes after the predetermined time has elapsed.

3. The method of controlling the power assist device according to claim 1, wherein:
   the operating part includes a deadman switch with which the drive of the driving portion is switched ON/OFF by the operator; and
   after the predetermined time has elapsed, the drive of the driving portion is resumed after the drive of the driving portion is switched ON with the deadman switch.

4. The method of controlling the power assist device according to claim 3, wherein even if the predetermined time has not elapsed, the drive of the driving portion resumes when the deadman switch is switched ON.

5. The method of controlling the power assist device according to claim 1, wherein:
   the operating part includes a deadman switch with which the drive of the driving portion is switched ON/OFF by the operator; and
   even if the predetermined time has not elapsed, the drive of the driving portion resumes when the deadman switch is switched ON.

6. The method of controlling the power assist device according to claim 1, wherein the drive of the robot arm by the driving portion is not stopped when a distance between the counter workpiece and one of the robot arm and the workpiece is equal to or greater than a predetermined distance.

7. The method of controlling a power assist device according to claim 1, wherein the predetermined time, over which the driving of the robot arm by the driving portion is stopped, is determined based on the distance between the counter workpiece and one of either the robot arm and the workpiece.

8. The method of controlling the power assist device according to claim 1, wherein:
   the robot arm includes a detecting portion that detects vibrations of the workpiece; and
   the predetermined time, over which the driving of the robot arm by the driving portion is stopped, is determined based on the vibration state of the workpiece detected by the detecting portion.

9. A method of controlling a power assist device that includes a holding portion that holds a workpiece; a driving portion that drives the holding portion, a conveying portion that conveys the holding portion in a predetermined direction, and a counter workpiece conveying means portion that conveys a counter workpiece, wherein the conveying portion is moved synchronously with the counter workpiece conveying portion, the control method comprising:
   controlling the conveying portion so that the conveying portion moves synchronously with the counter workpiece when a conveyance path is in motion; and
   stopping control over the driving portion for a predetermined time period to stop drive of the holding portion when the motion of the counter workpiece on the conveyance path has stopped or when the motion of the conveyance path resumes.

10. A power assist device comprising:
   an operating part that is operated by an operator;
   an operating force detecting portion that detects an operating force applied to the operating part;
   a robot arm that supports the operating part and holds a workpiece;
   a driving portion that drives the robot arm based on the operating force detected by the operating force detecting portion;
   a conveying portion that conveys the robot arm in a predetermined direction;
   a counter workpiece conveying portion that conveys a counter workpiece,
   a controller that controls motions of the driving portion and the conveying portion, wherein the controller controls the conveying portion to moved synchronously with the counter workpiece conveying portion; and
   wherein the controller controls the conveying portion synchronously with the counter workpiece conveying portion when a conveyance path is in motion, and
   wherein the controller controls the driving portion to stop control over the drive of the robot arm, for a predetermined time period when the motion of the counter workpiece on the conveyance path has stopped or when the motion of the conveyance path resumes.

11. The power assist device according to claim 10, wherein the controller controls the drive of the robot arm by the driving portion to resume after the predetermined time has elapsed.

12. The power assist device according to claim 10, wherein:
- the operating part includes a deadman switch by which the operator switches the drive of the driving portion ON/OFF; and
- when the predetermined time has elapsed, the controller resumes the drive of the driving portion when the drive of the driving portion is switched ON with the deadman switch.

13. The power assist device according to claim 12, wherein even if the predetermined time has not elapsed, the controller resumes the drive of the driving portion by switching the deadman switch from OFF to ON.

14. The power assist device according to claim 10, wherein:
- the operating part includes a deadman switch by which the operator switches the drive of the driving portion ON/OFF; and
- even if the predetermined time has not elapsed, the controller resumes the drive of the driving portion by switching the deadman switch from OFF to ON.

15. The power assist device according to claim 10, wherein the controller does not stop the drive of the robot arm by the driving portion, if a distance between the counter workpiece and one of the robot arm and the workpiece is equal to or greater than a predetermined distance.

16. The power assist device according to claim 10, wherein the controller stops the drive of the robot arm by the driving portion for the predetermined time, in accordance with a distance between the counter workpiece and one of the robot arm and the workpiece.

17. The power assist device according to claim 10, wherein:
- the robot arm includes detecting portion that detects vibrations of the workpiece; and
- the controller stops the drive of the robot arm by the driving portion for the predetermined time, in accordance with the vibration state of the workpiece detected by the detecting portion.

18. A power assist device comprising:
- a holding portion that holds a workpiece;
- a driving portion that drives the holding portion;
- a conveying portion that conveys the holding portion in a predetermined direction;
- a counter workpiece conveying portion for conveying a counter workpiece,
- a controller that controls motions of the driving portion and the conveying portion, wherein the controller controls the conveying portion to move synchronously with the counter workpiece conveying portion; and
- wherein the controller controls the conveying portion synchronously with the counter workpiece conveying portion when a conveyance path is in motion, and
- wherein the controller controls the driving portion to stop control over the drive of the holding portion, for a predetermined time period when the motion of the counter workpiece on the conveyance path has stopped or when the motion of the conveyance path resumes.

* * * * *

UNITED STATES PATENT AND TRADEMARK OFFICE
CERTIFICATE OF CORRECTION

PATENT NO. : 8,392,024 B2  
APPLICATION NO. : 12/919573  
DATED : March 5, 2013  
INVENTOR(S) : Murayama et al.

Page 1 of 1

It is certified that error appears in the above-identified patent and that said Letters Patent is hereby corrected as shown below:

On the Title Page:

In the Abstract, at line 4:
Delete "When a body in motion" and insert therefor --When a body is in motion--;

In the Specifications:

In the section entitled Background of the Invention, at column 1, line 61:
Delete "occur may occur" and insert therefor --may occur--;

In the section entitled Detailed Description of Example Embodiment, at column 8, line 67:
Delete "the drive, of the acturator" and insert therefor --the drive of the acturator--; and at column 9, line 64:
　　Delete "Instead, after t" and insert therefor --Instead, after it--;

In the Claims, at column 12, claim 9, line 24:
Delete "conveying means portion" and insert therefor --conveying portion--.

Signed and Sealed this  
Thirteenth Day of August, 2013

Teresa Stanek Rea  
*Acting Director of the United States Patent and Trademark Office*